United States Patent
Finkelstein

[15] 3,678,060
[45] July 18, 1972

[54] PROCESS FOR SEPARATING AN ACID FROM AN AMIDE

[72] Inventor: Ehud Finkelstein, Edison, N.J.
[73] Assignee: Merck & Co., Inc., Rahway, N.J.
[22] Filed: Aug. 3, 1970
[21] Appl. No.: 60,657

[52] U.S. Cl. ............260/295.5 A, 260/295 R, 260/295 AM, 260/295.5 R
[51] Int. Cl. .......................................................C07d 31/44
[58] Field of Search ................260/295 R, 295 AM, 295.5 R, 260/295.5 A

[56] References Cited

OTHER PUBLICATIONS

Atsuaki et al., " Kogyo Kagaki Zasshi" Vol. 60, p. 875, (1957)

Primary Examiner—Alan L. Rotman
Attorney—Julian S. Levitt, Harry E. Westlake, Jr. and I. Louis Wolk

[57] ABSTRACT

Process for obtaining an amide from a mixture containing an acid and said amide via an anion exchange resin mechanism.

7 Claims, No Drawings

PROCESS FOR SEPARATING AN ACID FROM AN AMIDE

This invention relates to a novel process for obtaining an amide by separating the components of a mixture containing an acid and said amide. More specifically, this invention relates to separating the components of a mixture containing acids such as niacin and amides such as niacinamide via an anion exchange resin mechanism.

The process of this invention involves the separation of niacin from niacinamide via an anion exchange resin mechanism which avoids the hydrolysis of niacinamide and the introduction of another anion into the pure effluent solution and the elution solution. The process of separating niacin from niacinamide involves regeneration, exhaustion and elution. The exhaustion and elution steps are performed by conventional methods. The regeneration step involves the adsorption by the anionic exchange resin of a carbonate anion. Examples of carbonates that may be employed in the regeneration step include soluble carbonates such as sodium carbonate, ammonium carbonate, potassium carbonate, lithium carbonate, cesium carbonate, cadmium carbonate, cerium carbonate, or rubidium carbonate. The use of a carbonate anion which is capable of forming water and liberating carbon dioxide in the presence of a proton constitutes a novel and unobvious improvement over the prior art processes and a more efficient process for separating the components of a mixture containing niacin and niacinamide. The reaction by which the carbonate anion is displaced from the resin involves two steps as shown below:

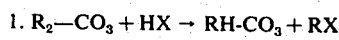

1. $R_2-CO_3 + HX \rightarrow RH-CO_3 + RX$

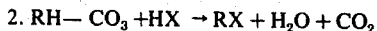

2. $RH-CO_3 + HX \rightarrow RX + H_2O + CO_2$ where R is the resin and X is the anion of the acid component contained in the mixture.

The prior art process for separating niacinamide from a mixture containing niacin and said niacinamide employs the adsorption of an hydroxy ion on the anion exchanger resin. The hydroxy anionic resin partially hydrolyzes niacinamide to ammonium nicotinate when passed through the column containing the anionic exchanger resin. For example, Atsuaki, Arai et. al., "Kogyo Kagaki Zasshi" 60 (1957) p. 875 separated the components of a mixture containing ammonium nicotinate and niacinamide by employing a mixed bed column which contained an anionic resin exchanger such as IRA.410 and a cationic resin enchanger such as IRC.50. The mixed bed column performed a two-fold purpose: 1) the cationic resin exchanger adsorbed ammonium cations from both the ammonium nicotinate contained in the mixture and the ammonium nicotinate resulting from partial hydrolysis of niacinamide by the hydroxy anion adsorbed on the anionic resin exchanger to niacin, and 2) the anionic resin adsorbed the niacin formed thus separating niacinamide from niacin.

In a continued search for an efficient process for separating an amide from an acid, I have found a novel process for separating said compounds. The prior art process which involves adsorbing an hydroxy anion on the resin has resulted in partial hydrolysis of the amide and thereby resulting in a reduction in the yield of said amide, or by using anion other than hydroxy, the introduction of another and possibly interfering ion into effluent solution containing the desired amide and the effluent solution. Avoiding the introduction of an anion into the product effluent solution is quite beneficial when water soluble amides are desired since the latter usually require a recycle process to maximize yield. In this invention, I have avoided the disadvantages of hydrolyzing the amide and the introduction of another ion into the desired product and the elution solutions by regenerating the resin with a soluble carbonate. The adsorbed carbonate is capable of forming water and liberating carbon dioxide, thus avoiding the undesirable hydrolysis of the amide and the introduction of another ion into the elution solution.

The methods presently employed to prepare amides present the problem of obtaining the amide in the desired quantity and purity. These methods of preparing amides, however, result in the production of undesirable impurities such as the unreacted starting material and formation of the corresponding acid. The process of separating the amide component from a mixture containing an acid and amide component is performed most efficiently, according to the invention, by regenerating the resin with a soluble carbonate which is capable of forming water and liberating carbon dioxide. Presently, amides are prepared by several methods known to the art. Some of the methods frequently employed to obtain amides are as shown below:

I. A nitrile compound such as 3-cyanopyridine, 4-cyanopyridine, propionitrile, valeronitrile, phenyl acetonitrile, or acetonitrile, is treated with base such as sodium hydroxide in the presence of water. The resulting solution contains the amide of the corresponding nitrile, the unreacted nitrile and the ammonium and sodium salts of the acid. The solution is then passed through a column containing a cationic resin such as IRC—50, or XE 89 to adsorb the cations thus converting the sodium and ammonium salts to the acid. The solution obtained contains an acid and the amide of the starting nitrile materials above which are niacin and niacinamide, isonicotinic acid and isonicotinamide, propionic acid and propionamide, valeric acid and valeramide, phenylacetic acid and phenylacetamide, acetic acid and acetamide respectively, and the corresponding nitrile.

II. An acid such as nicotinic acid, benzoic acid, propionic acid, phenyl acetic acid, valeric acid, or isonicotinic acid is treated with a base such as ammonia to obtain a mixture containing the amide and the ammonium-acid anion complex of the acid employed as the starting material. The solution then might be passed through a column containing a cationic resin such as IRC—50, IR—4B, CG—50, or XE 89 to complete the exchange of the salt of the acid to the acid. The solution thus obtained contains the starting material and the corresponding amide which are nicotinate and niacinamide, benzoate and benzamide, propionate and propionic acid and propionamide, phenyl acetic acid and phenylacetamide, valeric acid and valeramide, or isonicotinic acid and isonicotinamide respectively.

The resulting mixtures of Steps I and II which contain an acid and an amide are separated according to the method of this invention.

One skilled in the art will readily appreciate that in addition to separating the components of a solution containing an acid and an amide as the non-ionic compound, other equivalent non-ionic compounds such as the various nitriles (I) listed on page 3, and esters can be separated from an acid, thereby, avoiding undesired hydrolysis.

This invention may be better understood from the details shown below: A column is packed with an anion exchanger resin in water. The resin is regenerated with a soluble carbonate to obtain $R_2.CO_3$ wherein R is the stationary part of the resin. The mixture to be purified, which contains an acid and an amide, is added to the column containing the rinsed resin. The amide component of the mixture passes through the column. The anion of the acid component of the mixture is adsorbed on the resin which releases the carbonate anion thus allowing the carbonate anion to react with the H⁻ion of the acid component to form an unstable carbonic acid which decomposes to water and carbon dioxide. The carbon dioxide is then released from the system. The column is then rinsed with water and treated with an excess of an acid such as sulfuric acid to displace the anion of the acid component from the resin thereby obtaining the sometimes desired acid component of the mixture. The resin, which now contains the adsorbed sulfate anion, is once again regenerated by an aqueous soluble carbonate solution thus completing the cycle and preparing the column for a recycle.

The reaction may be performed in a downflow or upflow mode. However, it is preferred to perform the reaction in an upflow mode due to the facility for releasing carbon dioxide.

The temperature at which the reaction may be carried out is not critical. It is preferred, however, to perform the reaction at room temperature.

The particular choice of anionic exchange resin which is to be employed in the practice of this invention is not critical. Any well known anion exchange resin may be employed. Representative members of such anion exchange resins include Dowex 1 or 2; Amberlite IRA 400, IRA 401, IRA 401S, IRA 402, IRA 405, IRA 410, IRA 425, IRA 411, XE 75, 78, or 98; Zeollex SB—I—HX, SB—II—HX, SB1—LX, or SB—I—MX: Kastel A500 or A 300; XE75, 78, or 98; Cochranex AL—AT, AM—AY, or AP—AQ; DeAcidite FF; Allassion AQ17, AQ27, or DC22; Diaion SA100, SA101, or SA200; Duolite A—42, A—101, A—40, A—102, or A—102D; Imac S5—30, S5—40, S5—50, S5—52, or S—3; Lewatit MP 500, MN, MP600, or M—II; Permutit ESB, S1, ES, S2, or A300D; Rosanex HB; Ionac A—570, A—580, or A—590; and Wofatit SBW, SBU, or L165.

The following examples illustrate a method of separating an acid from an amide. The examples should be construed merely as an illustration of the invention rather than as a limitation thereof.

EXAMPLE 1

85.5 liters of IRA 400 resin are packed in a 1 foot diameter column, regenerated with a 5 percent aqueous solution of sodium carbonate and rinsed with water. 665 liters of an aqueous feed solution containing a total amount of 30.8 Kg. of niacinamide and 4.75 Kg. of niacin are passed through the column. The flow rate of said solution is 8.5 liters per minute and the pH is 3.5. The 665 liters of the effluent contained less than 10 milligrams of niacin per liter. The pH of the effluent is 8.6.

The concentration of the niacinamide in the effluent is the same as that of the feed. The column is then rinsed with five bed volumes of water and treated with nine bed volumes of (1.5 percent) nitric acid. As a result of the nitric acid treatment, the entire amount of adsorbed nicotinate is displaced from the resin. The column is rinsed with water before the recycle.

EXAMPLE 2

In the table below are examples which show the advantage of the carbonate cycle over the hydroxy cycle. Said examples are performed in a 1 inch column containing 50 ml. of IRA 400 resin. The resin is regenerated with a 5 percent aqueous solution of sodium carbonate and rinsed with water, Column 1 represents the cycle employed in the example. The concentration of the component, the total amount of niacin therein, and the volume of the solution to be poured in the column are shown by the table below in columns 2–4. The pH and flow rate of said solution is shown by columns 5 and 6 respectively.

Column 7 represents the pH of the effluent solution containing niacinamide which passed through the column. Column 8 represents the quantity of niacin formed during the separation process. The column is then rinsed with water and treated with nine bed volumes of (1.5 percent) nitric acid. As a result of the nitric acid treatment, the entire amount of adsorbed nicotinate is displaced from the resin. The column is rinsed with water before the recycle.

| 1 | 2 | 3 | 4 | 5 | 6 | 7 | 8 |
|---|---|---|---|---|---|---|---|
| Cycle | Concentration of components in grams per liter | Total niacin in solution (g.) | Volume of solution (ml.) | pH of solution | Flow rate (ml./min.) | Effluent pH | Niacin formed (g.) |
| ($CO_3^=$) | 160 niacinamide and 6.1 niacin | 7.14 | 1,170 | 9.5 | 2 | 10.6 | 0 |
| ($CO_3^=$) | do | 6.65 | 1,100 | 9.5 | 2 | 10.6 | 0.3 |
| ($CO_3^=$) | 333 niacinamide | 0 | 1,000 | 7.0 | 5 | 9.5 | 0.175 |
| (OH—) | 283 niacinamide | 0 | 2,500 | 7.0 | 11.6 | 10.5 | 3.2 |
| (OH—) | 283 niacinamide and $NH_4OH$ to pH 9.5 | 0 | 1,000 | 9.5 | 7 | 11 | 3.2 |
| (OH—) | 283 niacinamide-6 niacin | 3 | 500 | 10.0 | 2.9 | 12.5 | 1.35 |
| (OH—) | 50 niacinamide | 0 | 1,000 | 7.0 | 8 | 10.5 | 0.95 |

NOTE.—Niacin formed: is the niacin formed due to hydrolysis of niacinamide in the column. Some hydrolysis is due to the presence of niacinamide in water.

As one may observe from a consideration of the above Table, the use of the carbonate cycle is far more efficient than the prior art hydroxy cycle in avoiding the undesirable hydrolysis of niacinamide. The advantage is clearly shown in column 8 which represents the amount of niacin formed due to hydrolysis of niacinamide. For example, when 333 grams of niacinamide is passed through the column containing the carbonate anion of the invention, a negligible amount of niacin is formed (0.175 grams). However, when a solution containing 283 grams of niacinamide is passed through, the prior art hydroxy cycle 3.2 grams of niacin is formed.

WE CLAIM:

1. An improved process for separating the components of a mixture containing an acid selected from the group consisting of niacin and isonicotinic and an amide selected from the group consisting of niacinamide and isonicotinamide via an anion exchanger resin mechanism, the improvement comprising employing an anion exchanger resin having absorbed thereon a water soluble carbonate.

2. The process of claim 1 wherein the soluble carbonate is sodium carbonate.

3. The process of claim 1 wherein the anionic exchanger resin is IRA·400.

4. The process of claim 1 wherein the acid is niacin and the amide is niacinamide.

5. The process of claim 1 wherein the acid is isonicotinic and the amide is isonicotinamide.

6. The process of claim 4 wherein the anionic exchange resin is IRA·400, and the soluble carbonate is sodium carbonate.

7. The process of claim 5 wherein the anionic exchanger resin is IRA·400, and the soluble carbonate is sodium carbonate.

* * * * *